(12) United States Patent
Abrol et al.

(10) Patent No.: US 7,269,186 B2
(45) Date of Patent: Sep. 11, 2007

(54) PROTOCOL FOR FRAMING A PAYLOAD

(75) Inventors: Nischal Abrol, San Diego, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 993 days.

(21) Appl. No.: 09/924,308

(22) Filed: Aug. 6, 2001

(65) Prior Publication Data

US 2003/0026292 A1 Feb. 6, 2003

(51) Int. Cl.
*H04J 3/00* (2006.01)
(52) U.S. Cl. .................. 370/476; 370/470
(58) Field of Classification Search ............ 370/242, 370/389, 392, 470, 471, 472, 476
See application file for complete search history.

(56) References Cited

U.S. PATENT DOCUMENTS

| | | | | |
|---|---|---|---|---|
| 4,494,233 A * | 1/1985 | Bahr et al. | ................. | 370/456 |
| 5,428,629 A * | 6/1995 | Gutman et al. | ............. | 714/758 |
| 5,675,591 A * | 10/1997 | Salzwedel et al. | .......... | 714/807 |
| 5,850,526 A * | 12/1998 | Chou | ........................ | 709/247 |
| 5,870,412 A * | 2/1999 | Schuster et al. | ............ | 714/752 |
| 6,173,431 B1 * | 1/2001 | Rittle | ........................ | 714/778 |
| 6,252,891 B1 * | 6/2001 | Perches | ...................... | 370/503 |
| 6,446,235 B1 * | 9/2002 | Drottar et al. | ............... | 714/781 |
| 6,665,673 B1 * | 12/2003 | Petersen et al. | .............. | 707/10 |
| 6,674,770 B1 * | 1/2004 | Jarfjord | ...................... | 370/505 |
| 6,678,246 B1 * | 1/2004 | Smyth | ........................ | 370/230 |
| 6,804,257 B1 * | 10/2004 | Benayoun et al. | .......... | 370/471 |
| 6,831,927 B1 * | 12/2004 | Castro | ........................ | 370/473 |
| 2002/0036993 A1 * | 3/2002 | Park et al. | .................. | 370/329 |
| 2002/0101832 A1 * | 8/2002 | Chen et al. | ................. | 370/318 |

FOREIGN PATENT DOCUMENTS

EP 1077562 2/2001

* cited by examiner

*Primary Examiner*—Huy D. Vu
*Assistant Examiner*—Christine Ng
(74) *Attorney, Agent, or Firm*—Kam T. Tam; Sayed Hossain Beladi; Thomas R. Rouse (57) ABSTRACT

Systems and techniques for establishing a communication link wherein a transmission source delimits frame boundaries of a payload, calculates a value as a function of a subset of the payload, and appends the value to the payload within the frame boundaries before transmission of the frame. A receiving source calculates a value as a function of a subset of the payload, compares the calculated value to the received value, and detects a valid payload as a function of the comparison. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

62 Claims, 5 Drawing Sheets

FIG. 5

PROTOCOL FOR FRAMING A PAYLOAD

FIELD

The present invention relates generally to communications systems, and more specifically, to a framing protocol for a payload.

BACKGROUND

In applications involving multiple processing devices, such as computers and the like, a suitable communications network is used for exchanging data. Associated with any communications network is a set of access protocols which enable a communications path to be established between the devices. Various access protocols have been standardized over time to allow an application process in any processing device that supports a specific standard to communicate freely with an application process in any other processing device supporting the same standard.

Early attempts at implementing such standards in computers were often based on a single, complex and unstructured software program that was difficult to test and modify. To overcome this problem, the International Standards Organization (ISO) proposed a layered approach as a reference model. Under the ISO reference model, the communication subsystem is broken down into a number of layers, each which performs a well-defined function, with a well-defined interface between itself and the layer immediately above and immediately below.

The ISO reference model is made up of seven layers. The three lower layers are network dependent and are concerned with the protocols to link two or more processing devices over the network. The three lower layers include the physical layer, the link layer, and the network layer. The physical layer is concerned with the physical and electrical interface between the processing device and the network. The link layer builds on the physical connection between the processing device and network by providing to the network layer reliable information. The link layer typically provides error correction and similar functions. The network layer sits above the link layer, and is responsible for establishing a network connection.

A common data link protocol used by processing devices is Point-to-Point Protocol (PPP). PPP provides a standard encapsulation for multiplexing different network layer protocols simultaneously over the same link. The basic procedures, methodologies and protocol formats are defined in "The Point-to-Point Protocol (PPP)", STD 51, RFC 1661, edited by Simpson, W., July 1994, the contents of which are incorporated herein by reference. This encapsulation uses high level data link control (HDLC) framing to delimit the encapsulated data. The HDLC framing is defined in "PPP in HDLC-like Framing", STD 51, RFC 1662, edited by Simpson, W., July 1994, the contents of which is incorporated herein by reference.

Each HDLC frame begins and ends with a flag field represented by 0x7e, and is used for frame synchronization. To avoid falsely detecting a flag field in the HDLC frame payload, a byte stuffing escape mechanism is used. In particular, prior to transmission, the HDLC frame payload is examined for the flag sequence 0x7e. If the flag sequence is detected in the payload, it is replaced with a two byte sequence consisting of 0x7d followed by the flag sequence 0x7e exclusive-or'd with 0x20. In addition, if the byte 0x7d is detected in the payload, it too is replaced with a two byte sequence consisting of 0x7d followed by 0x7d exclusive-or'd with 0x20. While this approach is fairly effective, the computational overhead associated with framing the payload is increased.

The integrity of the HDLC frame can be monitored with a 16- or 32-bit cyclic redundancy check (CRC) on the payload. The CRC is calculated by performing a known algorithm on the binary bit stream forming the payload. At the receiving end, the CRC can be recalculated based on the received payload, and the calculated CRC can be compared to the transmitted CRC in the HDLC frame. If the calculated CRC does not match the transmitted CRC in the HDLC frame, a CRC error flag is set. This CRC approach, although improving error detection capability, also has the undesirable effect of increasing the computational overhead associated with framing the payload.

Given the tremendous increase in data rates needed to support today's technology, the overhead imposed by HDLC for PPP becomes progressively more burdensome. This is particularly true for hand-held wireless devices, such as cellular mobile phones and personal digital assistants, where the computational overhead of networking protocols is significant compared to application level processing. Accordingly, it would be advantageous to have an efficient and robust framing protocol that can be tailored to specific applications to reduced computational overhead and streamline the payload.

SUMMARY

In one aspect of the present invention, a method of framing a payload includes delimiting frame boundaries of a payload, calculating a value as a function of a subset of the payload, and appending the value to the payload within the frame boundaries.

In another aspect of the present invention, a method of determining a valid payload in a frame includes identifying a frame having a payload with a first value appended thereto, calculating a second value as a function of a subset of the payload, comparing the second value to the first value, and detecting a valid payload as a function of the comparison.

In yet another aspect of the present invention, computer-readable media embodying a program of instructions executable by a computer perform a method of framing a payload including delimiting frame boundaries of a payload, calculating a value as a function of a subset of the payload, and appending the value to the payload within the frame boundaries.

In a further aspect of the present invention, computer-readable media embodying a program of instructions executable by a computer performs a method of determining a valid payload in a frame including identifying a frame having a payload with a first value appended thereto, calculating a second value as a function of a subset of the payload, comparing the second value to the first value, and detecting a valid payload as a function of the comparison.

In yet a further aspect of the present invention, a communications device includes a processor configured to delimit frame boundaries of a payload, calculate a value as a function of a subset of the payload, and append the value to the payload within the frame boundaries, and a transmitter configured to transmit the processed frame.

In another aspect of the present invention, a communications device includes a receiver configured to receive a frame having a payload with a first value appended thereto, and a processor configured to calculate a second value as a function of a subset of the payload, compare the second value to the first value, and detect a valid payload as a function of the comparison.

In yet another aspect of the present invention, a communications device includes means for delimiting frame boundaries of a payload, calculation means for calculating a value as a function of a subset of the payload, and appending means for appending the value to the payload within the frame boundaries.

In a further aspect of the present invention, a communications device includes means for identifying a frame having a payload with a first value appended thereto, calculation means for calculating a second value as a function of a subset of the payload, comparison means for comparing the second value to the first value, and detection means for detecting a valid payload as a function of the comparison.

It is understood that other embodiments of the present invention will become readily apparent to those skilled in the art from the following detailed description, wherein it is shown and described only embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

In an exemplary embodiment of a communications system, a low overhead framing protocol can be used for network layer traffic. The low overhead framing protocol can be tailored to specific applications to reduce computational overhead based on known parameters. By way of example, a transmission control protocol (TCP) network layer with error detection capability is often run over PPP encapsulated data. Consequently, the computational overhead of the low overhead framing protocol for PPP encapsulated data can be reduced by eliminating the error correction function at the link layer. In a terrestrial link between a subscriber station and a radio network in a code division multiple access (CDMA) cellular system, reductions in computational overhead can be realized because the maximum payload is known. In communications system other than CDMA cellular systems, such as cable modems, digital subscriber lines, fiber optic links, satellite systems, and the like, known communication parameters can be used to construct a low overhead framing protocol in a variety of ways that reduce the computational overhead. Accordingly, any reference to the low overhead framing protocol in the context of a CDMA cellular system is intended only to illustrate the inventive aspects of the present invention, such aspects being applicable to a wide variety of communications systems.

Figure 1:
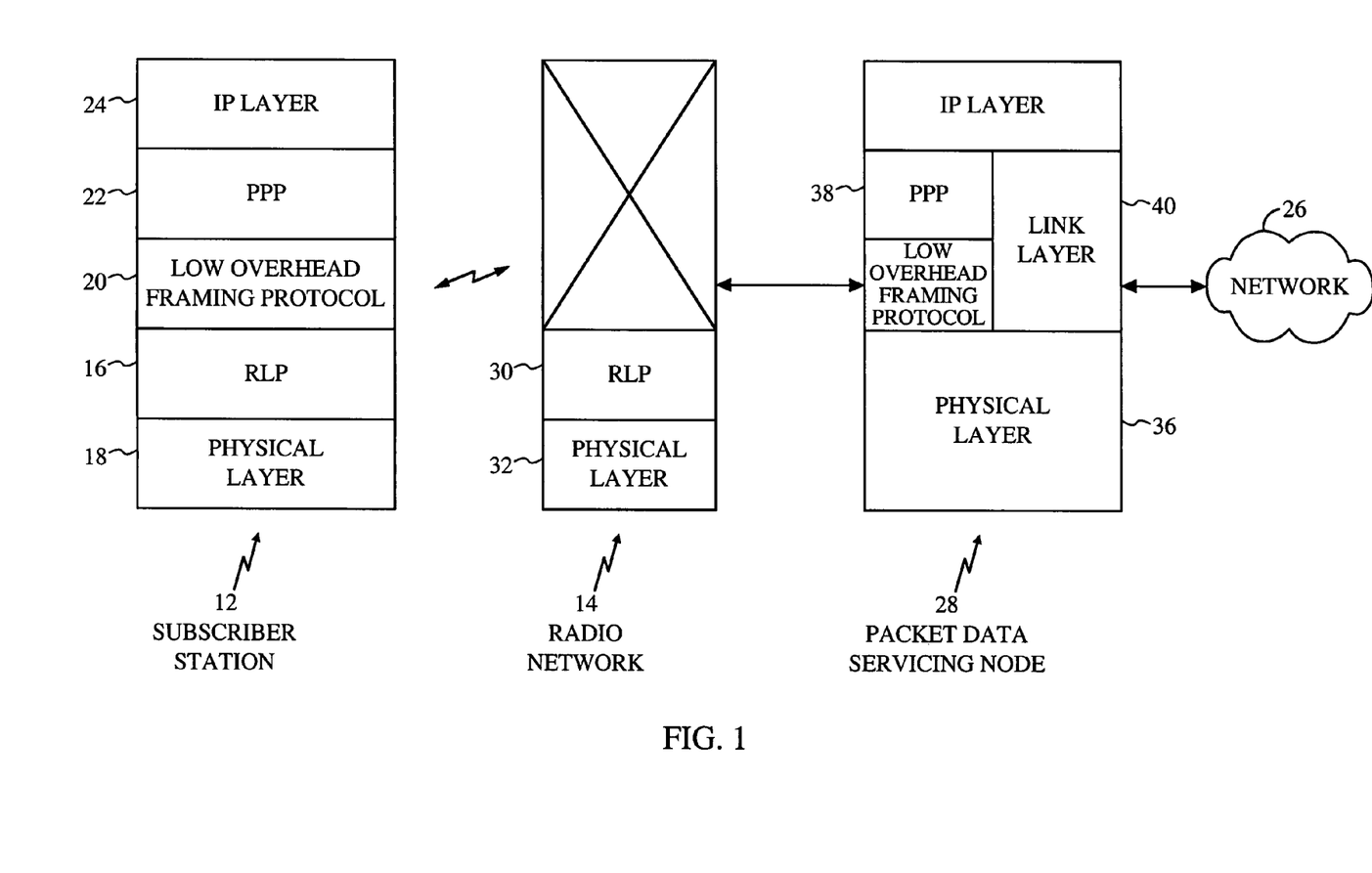
FIG. 1 is a protocol reference model for a CDMA cellular system in accordance with an exemplary embodiment.

FIG. 1 is a simplified exemplary protocol reference model for a CDMA cellular system. A more detailed protocol reference model can be found in TIA/EIA/IS-835; cdma2000 Wireless IP Network Standard, December 2000, the contents of which is incorporated herein by reference. Referring to FIG. 1, a subscriber unit 12 is shown in communication with a radio network 14. The exemplary subscriber unit 12 runs a radio link protocol (RLP) 16 over a physical layer 18. The physical layer 18 includes a CRC methodology to detect corrupt frames. Frames with a faulty CRC are discarded. These discarded frames are detected by the RLP with a negative acknowledgment (NAK) requesting re-transmission from the radio network 14.

A low overhead framing protocol 20 can be run over the RLP layer 16. Since the exemplary subscriber unit 12 has a physical layer 18 utilizing a CRC for corrupt frame detection and uses RLP 16 to reduce the frame error rate, the low overhead framing protocol can be structured to minimize the overhead since it only needs to be concerned with lost bytes when one or more NAK attempts are unsuccessful. The low overhead framing protocol 20 communicates with a PPP layer 22 to exchange PPP encapsulated data. The PPP layer 22, in turn, communicates with an IP layer 24 to exchange the PPP payload.

In the described exemplary CDMA cellular system, the subscriber unit communicates with a network 26 through one or more base stations. The base stations route the communications from the subscriber unit through a base station and a base station controller to a packet data servicing node (PDSN) 28. The base station and base station controller are represented in FIG. 1 by the radio network 14. The radio network 14 runs RLP 30 above a physical layer 32. The physical layer 32 provides a physical link between the subscriber unit 12 and the PDSN 28 with the link layer traffic being transparent to the radio network 14. The PDSN 28 provides a gateway to the network 26. The PDSN 28 also terminates the PPP link 38 and is adapted to employ a link layer protocol 40 suitable for the network 26.

Figure 2:
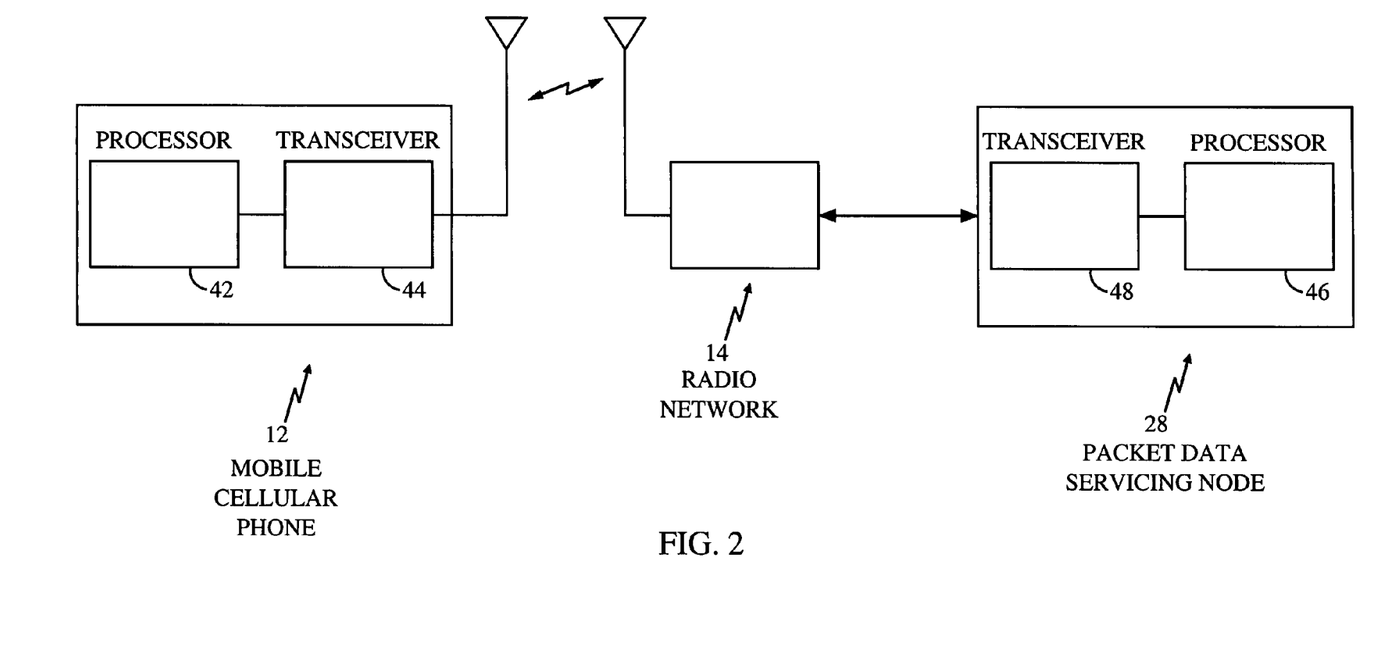
FIG. 2 is a functional block diagram of a CDMA cellular system utilizing a low overhead framing protocol in accordance with an exemplary embodiment.

An exemplary CDMA cellular system utilizing the low overhead framing protocol is shown in FIG. 2. The subscriber unit 12 includes a processor 42 coupled to a transceiver 44. The subscriber unit 12 is in two-way communication with the PDSN 28 via the radio network 14. The PDSN 28 also includes a processor 46 coupled to a transceiver 48.

The processors 42, 46 can be implemented with a variety of technologies including, by way of example, communications software run on a microprocessor. Alternatively, one or both processors 42, 46 can be implemented with any conventional processor, controller, microcontroller, programmable logic device, array of logic elements, or state machine.

In a forward link (which refers to transmission from the PDSN 28 to the subscriber unit 12), the processor 46 is responsible for framing the payload, by way of example PPP encapsulated data, with the low overhead framing protocol. In particular, the processor 46 delimits the frame, disposes the payload within the frame delimitation, calculates one or more values as a function of a subset of the payload, and appends the calculated values to the payload within the frame delimitation. The framed payload is then coupled to the transceiver 48. The transceiver includes a transmitter (not shown) which modulates and amplifies the frame to a level suitable for transmission to the subscriber unit 12 (via the radio network 14).

The transceiver 44 at the subscriber unit 12 includes a receiver (not shown) which amplifies, filters, and demodulates the frame. The demodulated frame is then coupled to the processor 42 to determine whether the payload is valid. The processor 42 calculates one or more values as a function a subset of the payload and then compares the calculated values with the received values appended to the payload. Based on that comparison, the processor 42 detects whether the payload is valid.

In a reverse link (which refers to transmission from the subscriber unit 12 to the PDSN 28) the processor 42 in the subscriber unit is responsible for framing the payload with the low overhead framing protocol. The processor 42 delimits the frame, disposes the payload within the frame delimitation, calculates one or more values as a function of a subset of the payload, and appends the calculated values to the payload within the frame delimitation. The framed payload is then coupled to the transceiver 44. The transceiver includes a transmitter (not shown) which modulates and amplifies the frame to a level suitable for transmission to the PDSN 28 (via the radio network 14).

The transceiver 48 at the PDSN 28 includes a receiver (not shown) which amplifies, filters, and demodulates the frame. The demodulated frame is then coupled to the processor 46 to determine whether the payload is valid. The processor 46 calculates one or more values as a function a subset of the payload and then compares the calculated values with the received values appended to the payload. Based on that comparison, the processor 46 detects whether the payload is valid.

In the exemplary CDMA cellular system, as well as other systems with similar communication parameters, a low overhead framing protocol can be structured to eliminate the need for escaping the flag sequence (via byte stuffing) and calculating the CRC over the entire payload. This can be accomplished with a frame structure having in sequential order a start flag, an initial checksum, a length field, a final checksum, and a stop flag. To avoid processing every byte in the frame, the initial and final checksums can be calculated over a small subset of the bytes in the payload.

Figure 3:
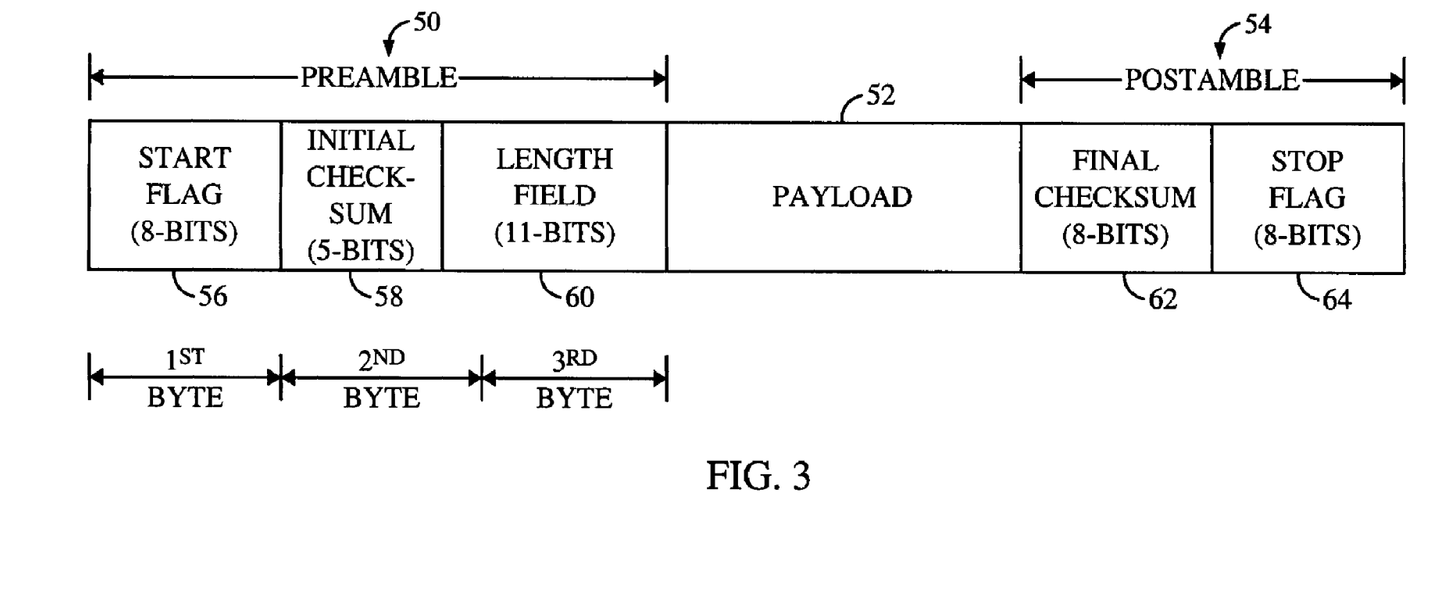
FIG. 3 is a format for a low overhead framing protocol in accordance with an exemplary embodiment.

FIG. 3 is an exemplary format for the low overhead framing protocol. The bits are transmitted serially from left to right with the most significant bits (MSB) transmitted first. The frame includes a preamble 50, a payload 52, and a postamble 54. The preamble 50 is three bytes long and includes a start flag 56 which is 8-bits, an initial checksum 58 which is 5-bits, and a length field 60 which is 11-bits. The first byte of the preamble is the start flag 56. The second byte of the preamble includes the 5-bit initial checksum 58 followed by the three MSBs of the length field 60. The remaining eight least significant bits (LSB) of the length field 60 makes up the third byte of the preamble 22. The payload can be any number of bytes, and in the described exemplary CDMA cellular system, is limited to a maximum of 1502 bytes. The postamble 54 is two bytes long and includes a final checksum 62 which is one byte and a stop flag 64 which is also one byte.

The start flag 56 can be a constant value or one that changes over time. In the described exemplary CDMA cellular system, the start flag is set to 0x(de). By setting the start flag to 0x(de), the differentiation process between the start flag 56 and the second byte of the preamble can simplified because the second byte of the preamble can never be 0x(de). This is because the maximum payload is 1502 bytes, and therefore, the length field cannot exceed a value equal to 0x(5cd). Since the four LSB's of the second byte of the preamble include the three MSB's of the length field, one can readily see that the four LSB's of the second byte of the preamble can never be 0x(e), as well as 0x6, 0x7, or 0x(f). Of course, those skilled in the art will appreciate that many other values can be selected as the start flag that could provide the same degree of differentiation between the start flag and the second byte of the preamble. By way of example, the start flag could be set at 0x(d6), 0x(d7), or 0x(df) and be readily distinguishable from the start flag. In fact, the four MSB's of the second byte of the preamble could be set to any value, and the ease of differentiation between the start flag and the second byte of the preamble could be maintained by setting the four LSB's to either 0x6, 0x7, 0x(e) or 0x(f). The particular value selected for the start flag is generally a matter of design choice.

The value selected for the start flag 56 can also be used for the stop flag 36. This approach can reduce overhead by using the stop flag of one frame as the start flag the next frame when the frames are received in an isochronous manner. If a delay exists between two successive frames, then a separate start flag should be sent to indicate the beginning of a new frame.

The initial checksum 58 can be calculated using any combination of bits. In the described exemplary CDMA cellular system, the initial checksum 58 is calculated by running an exclusive-or over the eight LSBs of the length field (i.e., the third byte of the preamble), and the third, fourth, and fifth bytes of the payload. The five MSBs of the 8-bit exclusive-or'd result are used. If the payload contains less than five bytes then only the bytes that are available are used. The third, fourth, and fifth bytes of payload are used to calculate the checksum because in most cases these bytes will contain the TCP checksum when the packet is header compressed. The TCP checksum will likely exhibit a greater degree of unpredictability then the remainder of the payload, thereby making the initial checksum as random as possible. A random initial checksum should decrease the probability of positively detecting a corrupted frame.

The length field 60 indicates the number of bytes in the payload, and where the location of the final checksum 62 is within the frame. In the described exemplary CDMA cellular system, the maximum permissible value for this field is 1502, which includes two bytes for the PPP protocol field and 1500 bytes of payload.

Similar to the initial checksum 58, the final checksum 62 can be calculated using any combination of bits. In the described exemplary CDMA cellular system, the final checksum is calculated by running an exclusive-or over the eight LSBs of the length field (i.e., the third byte of the preamble), and the third, fourth, fifth and last bytes of the payload. If the payload contains less than five bytes then only the bytes that are available are used.

The checksum calculations are best understood with reference to the following two examples. In the first example, if a frame has a two byte payload, then only the last byte of the length field would be used in the initial checksum calculation (as none of the other required bytes of the payload are present). The final checksum would be calculated using the eight LSBs of the length field and the second byte of the payload.

By way of example, if the first byte of the payload is 0x21 and the second byte of the payload is 0x(aa), the initial checksum would be calculated using the eight LSBs of the length field which is 0x02 (indicating a payload of two bytes). The initial checksum would be equal to the five MSBs of the length field, or 0x00. The final checksum would be calculated by exclusive or'ing the eight MSB's of the length field 0x02 with the last byte of the payload 0x(aa) resulting in a final checksum of 0x(a8). The final exemplary frame would be constructed as follows (where the payload is between the | characters):

de 00 02|21 aa|a8 de

In the second example, if a frame having has five byte payload, then the initial checksum would be calculated using the eight LSBs of the length field, and the third, fourth and fifth bytes of the payload. The final checksum would be calculated using the eight LSB's of the length field, and the third, fourth and fifth bytes of the payload, and the last byte of the payload (which, in this case, is the fifth byte again).

By way of example, if the five byte payload is 0x21, 0x0b, 0x22, 0x3a, 0x0a, the initial checksum would be calculated by exclusive or'ing the eight LSBs of the length field which is 0x05 with the 0x22, 0x3a, 0x0a. The initial checksum would be 0x10 (05 XOR 22 XOR 3a XOR 0a). The final checksum would be 0x(id) (05 XOR 22 XOR 3a XOR 0a XOR 0a). The final exemplary frame would be constructed as follows (where the payload is between the | characters):

de 10 05|21 0b 22 3a 0a|1d de

Figure 4:
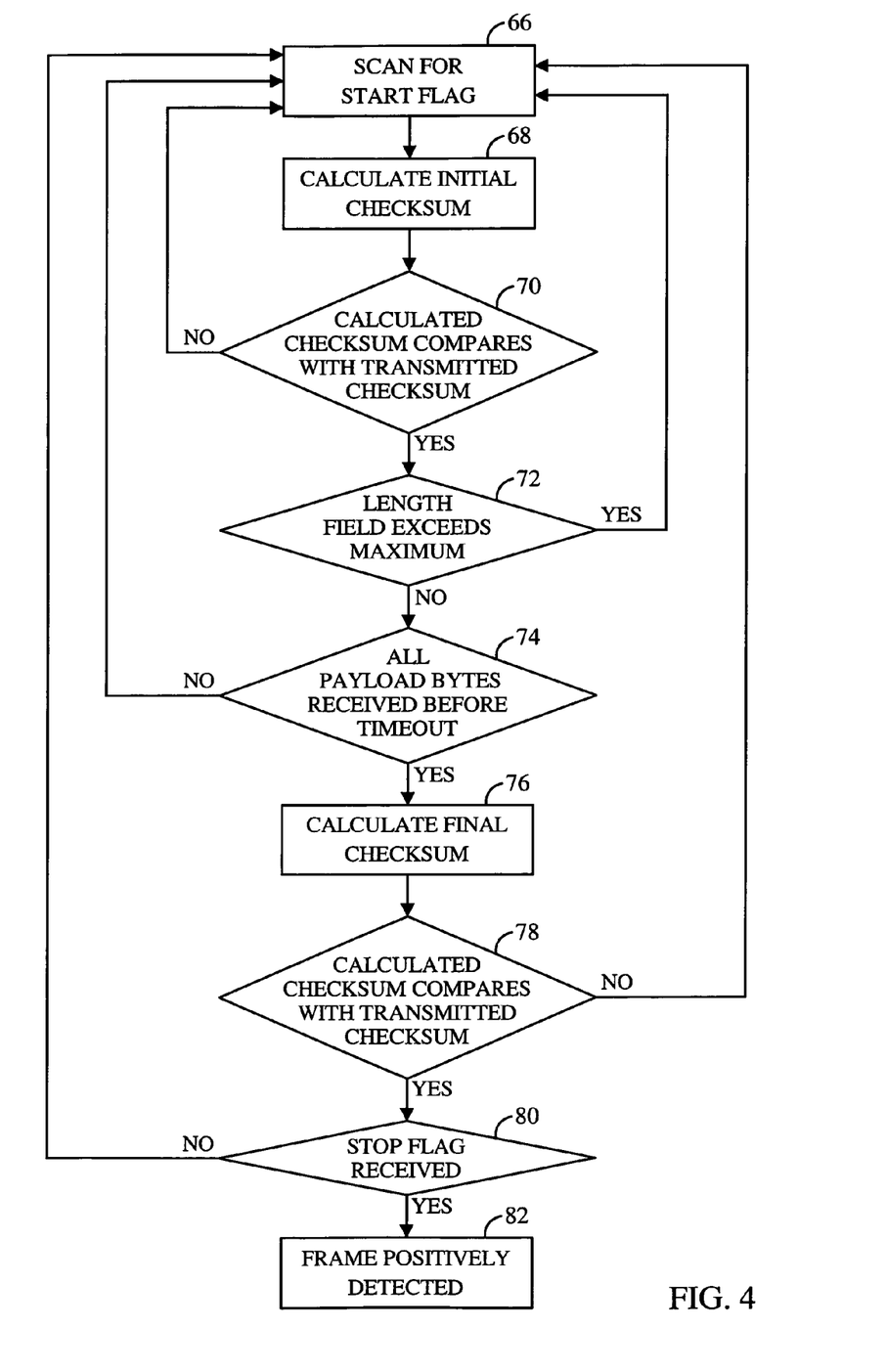
FIG. 4 is a flowchart demonstrating a detection methodology for a payload using a low overhead framing protocol in accordance with an exemplary embodiment.

Turning to FIG. 4, a flowchart demonstrating an exemplary detection methodology of a low overhead framing protocol is shown. In step 66, the receiver scans the serial byte stream for the start flag. Once the start flag is detected, the receiver waits for the required number of bytes to arrive so that it can calculate the initial checksum. In the described exemplary CDMA cellular system, the initial checksum, the length field, and the first five bytes of the payload must be received in order to calculate the initial checksum.

In step 68, the receiver calculates the initial checksum. The calculated initial checksum is then compared to the transmitted initial checksum in step 70. If the calculated initial checksum does not match the transmitted initial checksum, then a false preamble has been detected. In response to a false preamble, the detected start flag is discarded and the receiver loops back to step 66 to begin scanning the serial byte stream for a new start flag beginning with the byte immediately following the discarded start flag. Conversely, if the calculated initial checksum matches the transmitted initial checksum, the value of the length field is then compared to a maximum value in step 72. If the value of the length field exceeds the maximum value, then a false preamble has been detected. As indicated above, a false preamble causes the receiver to discard the detected start flag and loop back to step 66 to begin scanning the serial byte stream for a new start flag beginning with the byte immediately following the discarded start flag. Conversely, if the length field is equal to or less than the maximum value, then the receiver has positively detected the preamble.

Although the procedures for positively detecting the preamble have been described by sequentially comparing the calculated checksum against the transmitted checksum, and then examining the value of the length field, those skilled in the art will appreciate that the order may be reversed, or alternatively, the checksum comparison and the examination of the length field value may be performed in parallel. Moreover, in alternative embodiments, the procedure for detecting a positive preamble can be limited to one of either the initial checksum comparison or the examination of the length field value, either alone or in combination with other known techniques.

Once the preamble has been positively detected, the receiver waits until it has received all the payload bytes specified by the length field before it performs any further processing of the frame. This may cause the receiver to stall if the preamble was falsely detected. To avoid the possibility of receiver stall, all the payload bytes should be received within a specific time period. In step 74, if the time period elapses before all the payload bytes specified in the length field have been received, then the detected start flag is discarded and the receiver loops back to step 66 to begin scanning the serial byte stream for a new start flag beginning with the byte immediately following the discarded start flag. Conversely, if all the payload bytes specified in the length field are received before the time period elapses, then the final checksum can be calculated.

In step 76, the final checksum is calculated. The calculated final checksum is then compared to the transmitted final checksum in step 78. If the calculated final checksum does not match the transmitted final checksum, then a false postamble has been detected. In response to a false postamble, the detected start flag is discarded and the receiver loops back to step 66 to begin scanning the serial byte stream for a new start flag beginning with the byte immediately following the discarded start flag. Conversely, if the calculated final checksum matches the transmitted final checksum, the byte immediately following the final checksum is then checked for the stop flag in step 80. If that byte is not a stop flag, then the frame is corrupted. In response to a corrupted frame, the detected start flag is discarded and the receiver loops back to step 66 to begin scanning the serial byte stream for a new start flag beginning with the byte immediately following the discarded start flag. Conversely, if the stop flag is detected immediately following the final checksum, then the frame has been positively detected and the receiver passes the payload to the upper layer in step 82.

The sequence of steps described above for positively detecting a frame is by way of example and not by way of limitation. Those skilled in the art will appreciate that these procedures can be performed in any order, either serially, in parallel, or any combination of serial and parallel procedures. Moreover, one or more specific procedures may be omitted or combined with any other techniques known in the art.

Receiver stall can be of great concern in many applications. Accordingly, certain procedures may be invoked to prevent the receiver from stalling during the delivery of payload bytes. By way of example, a timer can be set for the estimated worst case delivery time for the maximum payload. If the timer lapses before all the payload bytes specified in the length field are received, the receiver declares a stall and begins scanning the serial byte stream for a new start flag beginning with the byte immediately following the previously detected start flag.

Figure 5:
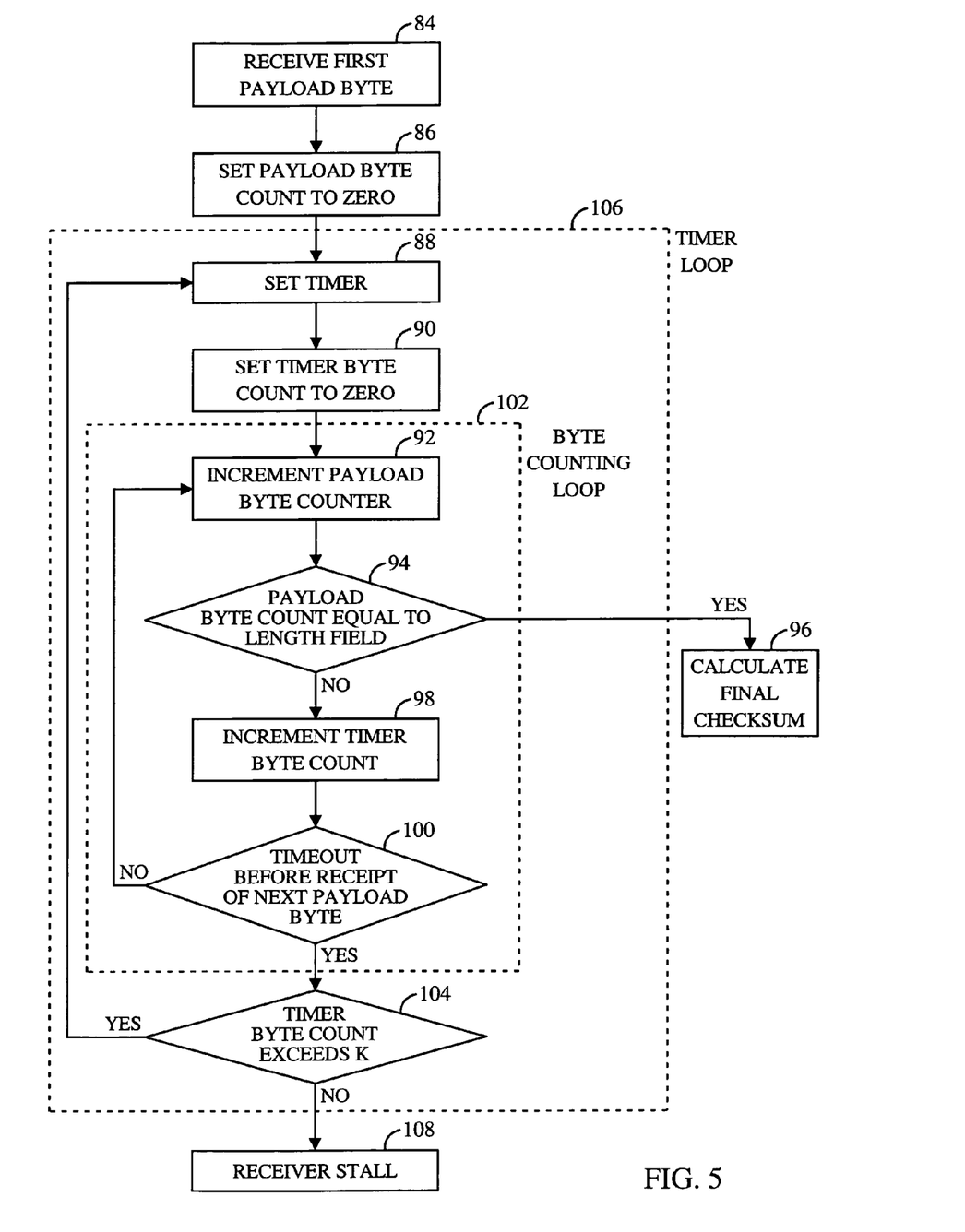
FIG. 5 is a flowchart demonstrating an methodology for detecting a receiver stall in accordance with an exemplary embodiment.

Alternatively, quicker response time to a receiver stall can be achieved by using a procedure outlined in the flow diagram of FIG. 5. In step 84, the first payload byte is received. In response, a payload byte count is set to zero in step 86, a timer is set to timeout at $t_1$ milliseconds (ms) in step 88, and a timer byte count is set to zero in step 90.

In step 92, the payload byte count is incremented to reflect the number of payload bytes received. The payload byte count is then compared to the length field value in step 94. If the payload byte count equals the length field value, the payload byte delivery is complete and the final checksum can be calculated in step 96. Conversely, if the payload byte count is less than the length field value, then the timer byte count is incremented in step 98 to reflect the number of bytes received since the timer was set.

The receiver then waits for the next payload byte in step 100. If the next payload byte is received before the timer lapses, then the receiver enters into a byte counting loop 102. In the byte counting loop 102, the byte count is incremented in step 92 to reflect the number of payload bytes received and the incremented byte count is again compared to the length field value in step 94 to determine whether the payload delivery is complete. If the incremented byte count is equal to the length field value, the receiver exits the byte counting loop 102 and calculates the final checksum in step 96. Conversely, if the byte count is less than the length field value, the timer byte count is incremented to reflect the number of bytes received since the timer was set in step 98. The receiver remains in the byte counting loop 102 until the payload delivery is complete or the timer lapses $t_1$ ms after receipt of the first payload byte.

Once the timer lapses ($t_1$ ms after the first payload byte is received), the timer byte count is compared to an implementation-defined constant K in step 104. If the timer byte count is greater than the constant K, the probability that payload bytes are actively being received is high. As a result, the receiver enters into a timer loop 106. In the timer loop 106, the timer is reset to timeout at timeout at $t_1$ ms in step 88 and the timer byte count is reset to zero in step 90. The receiver then enters into the byte counting loop 102 until the payload delivery is complete or the timer lapses.

Once the timer lapses, the timer byte count is again compared to the constant K in step 104. If the timer byte count exceeds the constant K, the receiver remains in the timer loop 106 until either the payload delivery is complete or the timer lapses with the timer byte count less than or equal to the constant K. If the timer lapses with the timer byte count less than or equal to the constant, the probability that payload bytes are not being received is high. In that event, the receiver declares a receiver stall in step 108, and begins scanning the serial byte stream for a new start flag beginning with the byte immediately following the previously detected start flag.

In the described exemplary CDMA cellular system, $t_1$ can be set to the time it would take to receive the maximum payload from the physical layer in an isochronous manner. If this approach is used, $t_1$ would be set to 1.5 seconds to accommodate 1502 bytes based on a 8000 bps physical link. However, the value of $t_1$ can be adaptable to handle speeds variations in the physical layer. The constant K can be set to 10, or can be adaptable to optimize the constant K based on known parameters of the upper layer byte stream.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Although exemplary embodiments of the present invention have been described, it should not be construed to limit the scope of the appended claims. Those skilled in the art will understand that various modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of framing a payload for communication of said payload in a communication system, the method comprising:

delimiting frame boundaries of a payload;

calculating an initial checksum as a function of a first subset of the payload and a length field of the payload;

calculating a final checksum as a function of a second subset of the payload and the length field of the payload; and appending the initial checksum and the final checksum to the payload within the frame boundaries for communication of said payload.

2. The method of claim 1 wherein the frame delimitation comprises appending a preamble to the beginning of the payload, the preamble having the initial checksum.

3. The method of claim 2 wherein the payload comprises a plurality of bytes, and the first subset of the payload comprises the third, fourth and fifth bytes of the payload following the preamble.

4. The method of claim 3 farther comprising disposing in the preamble the length field which indicates the number of bytes in the payload.

5. The method of claim 4 wherein the calculation of the initial checksum comprises exclusive OR-ing the first subset of the payload and the length field.

6. The method of claim 5 wherein the second subset of the payload comprises the third, fourth and fifth bytes of the payload following the preamble, and the last byte of the payload, and wherein the calculation of the final checksum comprises exclusive OR-ing the second subset of the payload and the length field.

7. The method of claim 1 wherein the frame delimitation comprises appending final checksum to the end of the payload.

8. The method of claim 7 wherein the payload comprises a plurality of bytes, and the second subset of the payload comprises the third, fourth and fifth bytes of the payload following the preamble, and the last byte of the payload.

9. The method of claim 8 wherein the frame delimitation comprises appending a preamble having the length field to the beginning of the payload.

10. The method of claim 9 wherein the calculation of the initial checksum comprises exclusive OR-ing the first subset of the payload and the length field.

11. A method of framing a payload for communication of said payload in a communication system, the method comprising:
 delimiting frame boundaries of a payload;
 calculating a value as a function of a subset of the payload; and
 appending the value to the payload within the frame boundaries, wherein the payload comprises a maximum number of bytes, and wherein the frame delimitation comprises appending a preamble to the beginning of the payload, the preamble comprising a start flag having a first byte, the value following the start flag, and a length field following the value, the length field indicating the number of bytes in the payload, and wherein the value and a portion of the length field comprises a second byte, the second byte being limited to a subset of byte values due to the maximum number of bytes in the payload, the method further comprising selecting a start flag having a byte value different from the subset of byte values available for the second byte for communication of said payload.

12. The method of claim 11 wherein the value comprises 5-bits and the length field comprises at least 3-bits, the second byte comprising the 5-bit value followed by the three most significant bits of the length field.

13. A method of determining validity of a payload in a frame communicated in a communication system, the method comprising:
 identifying a received frame having a payload with a first value appended thereto;
 calculating a second value as a function of a subset of the payload;
 comparing the second value to the first value;
 detecting a valid payload as a function of the comparison wherein the payload comprises a plurality of bytes; and
 identifying a length field in the frame indicating the number of bytes in the payload, wherein the calculation of the second value is further a function of the length field, wherein the subset of the payload comprises the third, fourth and fifth bytes of the payload following the preamble, and the calculation of the second value comprises exclusive OR-ing the subset of the payload and the length field for determining validity of the payload in the received frame.

14. A method of determining validity of a payload in a frame communicated in a communication system, the method comprising:
 identifying a received frame having a payload with a first value appended thereto;
 calculating a second value as a function of a subset of the payload;
 comparing the second value to the first value;
 detecting a valid payload as a function of the comparison, wherein the frame including the payload comprises a plurality of bytes;
 receiving the frame in a serial byte stream;
 counting the number of payload bytes received within a predetermined time;
 declaring an invalid frame if the payload byte count within the predetermined time is below a threshold;
 recounting the number of payload bytes received within a second predetermined time if the payload byte within the predetermined time exceeds the threshold for determining validity of the payload in the received frame.

15. A method of determining validity of a payload in a frame communicated in a communication system, the method comprising:
 identifying a received frame having a payload with a first value appended thereto;
 calculating a second value as a function of a subset of the payload;
 comparing the second value to the first value; and
 detecting a valid payload as a function of the comparison, wherein the first value is appended to the beginning of the payload, the frame further comprising a third value appended to the end of the payload, the method further comprising calculating a fourth value as a function of a second subset of the payload, and comparing the fourth value to the third value, the valid payload detection being a function of both the comparison of the first value to the second value and the comparison of the third value to the fourth value, wherein valid payload detection further comprises confirming a stop flag within the frame immediately following the third value, wherein the payload comprises a plurality of bytes, the method further comprising identifying a length field in the frame indicating the number of bytes in the payload, the calculation of the second value and the calculation of the fourth value are both further a function of the length field wherein the subset of the payload comprises the third, fourth and fifth bytes of the payload following the preamble, and the second subset of the payload comprises the third, fourth and fifth bytes of the payload following the preamble and the last byte of the payload for determining validity of the payload in the received frame.

16. The method of claim 15 wherein calculation of the second value comprises exclusive OR-ing the subset of the payload and the length field, and the calculation of the fourth value comprises exclusive OR-ing the second subset of the payload and the length field.

17. Computer-readable media embodying a program of instructions executable by a computer to perform a method of framing a payload, the method comprising:
 delimiting frame boundaries of a payload;

calculating an initial checksum as a function of a first subset of the payload and a length field of the payload;

calculating a final checksum as a function of a second subset of the payload and the length field of the payload; and appending the initial checksum and the final checksum to the payload within the frame boundaries.

18. The computer-readable media of claim 17 wherein the frame delimitation comprises appending a preamble to the beginning of the payload, the preamble having the initial checksum.

19. The computer-readable media of claim 18 wherein the payload comprises a plurality of bytes, and the first subset of the payload comprises the third, fourth and fifth bytes of the payload following the preamble.

20. The computer-readable media of claim 19 wherein the method further comprises disposing in the preamble the length field which indicates the number of bytes in the payload.

21. The computer-readable media of claim 20 wherein the calculation of the initial checksum comprises exclusive OR-ing the first subset of the payload and the length field.

22. The computer-readable media of claim 21 wherein the second subset of the payload comprises the third, fourth and fifth bytes of the payload following the preamble, and the last byte of the payload, and wherein the calculation of the final checksum comprises exclusive OR-ing the second subset of the payload and the length field.

23. The computer-readable media of claim 17 wherein the frame delimitation comprises appending the final checksum to the end of the payload.

24. The computer-readable media of claim 23 wherein the payload comprises a plurality of bytes, and the second subset of the payload comprises the third, fourth and fifth bytes of the payload following the preamble, and the last byte of the payload.

25. The computer-readable media of claim 24 wherein the frame delimitation comprises appending a preamble having the length field to the beginning of the payload.

26. The computer-readable media of claim 25 wherein the calculation of the initial checksum comprises exclusive OR-ing the first subset of the payload and the length field.

27. Computer-readable media embodying a program of instructions executable by a computer to perform a method of framing a payload, the method comprising:

delimiting frame boundaries of a payload;

calculating a value as a function of a subset of the payload; and appending the value to the payload within the frame boundaries, wherein the payload comprises a maximum number of bytes, and wherein the frame delimitation comprises appending a preamble to the beginning of the payload, the preamble comprising a start flag having a first byte, the value following the start flag, and a length field following the value, the length field indicating the number of bytes in the payload, and wherein the value and a portion of the length field comprises a second byte, the second byte being limited to a subset of byte values due to the maximum number of bytes in the payload, the method further comprising selecting a start flag having a byte value different from the subset of byte values available for the second byte.

28. The computer-readable media of claim 27 wherein the value comprises 5-bits and the length field comprises at least 3-bits, the second byte comprising the 5-bit value followed by the three most significant bits of the length field.

29. Computer-readable media embodying a program of instructions executable by a computer to perform a method of determining a valid payload in a frame, the method comprising:

identifying a frame having a payload with a first value appended thereto;

calculating a second value as a function of a subset of the payload;

comparing the second value to the first value; and detecting a valid payload as a function of the comparison wherein the payload comprises a plurality of bytes, the method further comprising identifying a length field in the frame indicating the number of bytes in the payload wherein the calculation of the second value is further a function of the length field, wherein the subset of the payload comprises the third, fourth and fifth bytes of the payload following the preamble, and the calculation of the second value comprises exclusive OR-ing the subset of the payload and the length field.

30. Computer-readable media embodying a program of instructions executable by a computer to perform a method of determining a valid payload in a frame, the method comprising:

identifying a frame having a payload with a first value appended thereto;

calculating a second value as a function of a subset of the payload;

comparing the second value to the first value; and detecting a valid payload as a function of the comparison wherein the frame including the payload comprises a plurality of bytes, the method further comprising receiving the frame in a serial byte stream, counting the number of payload bytes received within a predetermined time, and declaring an invalid frame if the payload byte count within the predetermined time is below a threshold, wherein the method further comprises recounting the number of payload bytes received within a second predetermined time if the payload byte within the predetermined time exceeds the threshold.

31. Computer-readable media embodying a program of instructions executable by a computer to perform a method of determining a valid payload in a frame, the method comprising:

identifying a frame having a payload with a first value appended thereto;

calculating a second value as a function of a subset of the payload;

comparing the second value to the first value; and detecting a valid payload as a function of the comparison, wherein the first value is appended to the beginning of the payload, the frame further comprising a third value appended to the end of the payload, the method further comprising calculating a fourth value as a function of a second subset of the payload, and comparing the fourth value to the third value, the valid payload detection being a function of both the comparison of the first value to the second value and the comparison of the third value to the fourth value wherein valid payload detection further comprises confirming a stop flag within the frame immediately following the third value wherein the payload comprises a plurality of bytes, the method farther comprising identifying a length field in the frame indicating the number of bytes in the payload wherein the calculation of the second value and the calculation of the fourth value are both further a function of the length field wherein the subset of the payload comprises the third, fourth and fifth bytes of the payload following the preamble, and the second subset of the payload comprises the third, fourth and fifth bytes of the payload following the preamble and the last byte of the payload.

32. The computer-readable media of claim 31 wherein calculation of the second value comprises exclusive OR-ing the subset of the payload and the length field, and the calculation of the fourth value comprises exclusive OR-ing the second subset of the payload and the length field.

33. A communications device for communication of a payload in a communication system, the communications device comprising:
  a processor configured to delimit frame boundaries of said payload, calculate an initial checksum as a function of a first subset of the payload and a length field of the payload, calculate a final checksum as a function of a second subset of the payload and the length field of the payload, and append the initial checksum and the final checksum to the payload within a frame boundaries to produce a processed frame; and
  a transmitter configured to transmit the processed frame.

34. The communications device of claim 33 wherein the processor is further configured to append a preamble to the beginning of the payload, the preamble having the initial checksum.

35. The communications device of claim 34 wherein the processor is further configured append the final checksum to the end of the payload within the frame boundaries.

36. The communications device of claim 35 wherein the payload comprises a plurality of bytes, the processor further configured to dispose in the preamble the length field which indicates the number of bytes in the payload.

37. The communications device of claim 36 wherein the second subset of the payload comprises the third, fourth and fifth bytes of the payload following the preamble, and the last byte of the payload, the processor further being configured to calculate the final checksum by exclusive or=ing the second subset of the payload and the length field.

38. The communications device of claim 33 wherein the payload comprises a plurality of bytes, the processor further being configured to dispose in the preamble the length field which indicates the number of bytes in the payload.

39. The communications device of claim 38 wherein the first subset of the payload comprises the third, fourth and fifth bytes of the payload following the preamble, the processor further being configured to calculate the initial checksum by exclusive OR-ing the first subset of the payload and the length field.

40. The communications device of claim 33 wherein the transmitter comprises a wireless transmitter.

41. The communications device of claim 40 wherein the transmitter comprises a code division multiple access transmitter.

42. A communications device for communication of a payload in a communication system, the communications device comprising:
  a receiver configured to receive a frame having the payload with a first value appended thereto; and
  a processor configured to calculate a second value as a function of a subset of the payload, compare the second value to the first value, and detect a valid payload as a function of the comparison wherein the payload comprises a plurality of bytes, the processor further being configured to identify a length field in the frame indicating the number of bytes in the payload, and to calculate the second value as a function of the subset of the payload and the length field, wherein the frame further comprises a preamble having the first value appended to the beginning of the payload, and wherein the subset of the payload comprises the third, fourth and fifth bytes of the payload following the preamble, the processor further being configured to calculate the second value by exclusive OR-ing the subset of the payload and the length field.

43. The communications device of claim 42 wherein the processor is further configured to determine whether the number of payload bytes indicated by the length field exceeds a threshold, the valid payload detection by the processor further being a function of the length field determination.

44. The communications device of claim 42 wherein the receiver is further configured to receive the frame in a serial byte stream, and wherein the processor is further configured to determine whether all the payload bytes are received within a predetermined time from receipt of the first payload byte, the valid frame detection by the processor further being a function of the payload byte determination.

45. The communications device of claim 44 wherein the processor is further configured to identify a length field in the frame indicating the number of bytes in the payload, the payload byte determination being a function of the length field indication.

46. The communications device of claim 43 wherein the receiver is further configured to receive the frame in a serial byte stream, and wherein the processor is further configured to count the number of payload bytes received within a predetermined time, and declare an invalid frame if the payload byte count within the predetermined time is below a threshold.

47. The communications device of claim 46 wherein the processor is further configured to recount the number of payload bytes received within a second predetermined time if the payload byte within the predetermined time exceeds the threshold.

48. A communications device for communication of a payload in a communication system, the communications device comprising:
  a receiver configured to receive frame having the payload with a first value appended thereto; and
  a processor configured to calculate a second value as a function of a subset of the payload, compare the second value to the first value, and detect a valid payload as a function of the comparison, wherein the payload comprises a plurality of bytes, the processor further being configured to identify a length field in the frame indicating the number of bytes in the payload, the calculation of both the second and fourth value by the processor being further a function of the length field wherein the first value is appended to the beginning of the payload, the frame further comprising a third value appended to the end of the payload, the processor further being configured to calculate fourth value as a function of a second subset of the payload, and compare the fourth value to the third value, the valid payload detection by the processor being a function of both the comparison of the first value to the second value and the comparison of the third value to the fourth value, wherein the subset of the payload comprises the third, fourth and fifth bytes of the payload following the preamble, and the second subset of the payload comprises the third, fourth and fifth bytes of the payload following the preamble and the last byte of the payload.

49. The communications device of claim 48 wherein the processor is further configured to calculate the second value by exclusive OR-ing the subset of the payload and the length field, and calculate the fourth value by exclusive OR-ing the second subset of the payload and the length field.

50. A communications device for communication of a payload in a communication system, the communications device, comprising:
   means for delimiting frame boundaries of said payload;
   calculation means for:
      calculating an initial checksum as a function of a first subset of the payload and a length of the payload,
      calculating a final checksum as a function of a second subset of the payload and the length of the payload; and
   appending means for appending the initial checksum and the final checksum to the payload within the frame boundaries.

51. The communications device of claim 50 wherein the appending means appends a preamble to the beginning of the payload, the preamble having the initial checksum.

52. The communications device of claim 51 wherein the payload comprises a plurality of bytes, and wherein the appending means disposes in the preamble the length field which indicates the number of bytes in the payload.

53. The communications device of claim 52 wherein the second subset of the payload comprises the third, fourth and fifth bytes of the payload following the preamble, and the last byte of the payload, and wherein the calculation means calculates the final checksum by exclusive OR-ing the second subset of the payload and the length field.

54. The communications device of claim 51 wherein the payload comprises a plurality of bytes, and wherein the appending means disposes in the preamble the length field which indicates the number of bytes in the payload, and the calculating means calculates the initial checksum as a function of the first subset of the payload and the length field.

55. The communications device of claim 54 wherein the first subset of the payload comprises the third, fourth and fifth bytes of the payload following the preamble, and wherein the calculation means calculates the initial checksum by exclusive OR-ing the first subset of the payload and the length field.

56. A communications device for communication of a payload in a communication system, the communications device comprising:
   means for identifying a frame having a payload with a first value appended thereto;
   calculation means for calculating a second value as a function of a subset of the payload;
   comparison means for comparing the second value to the first value; and
   detection means for detecting a valid payload as a function of the comparison,
   wherein the payload comprises a plurality of bytes, the communications device farther comprising means for identifying a length field in the frame indicating the number of bytes in the payload, wherein the calculation means calculates the second value as a function of the subset of the payload and the length field, wherein the frame further comprises a preamble having the first value appended to the beginning of the payload, and the subset of the payload comprises the third, fourth and fifth bytes of the payload following the preamble, and wherein the calculation means calculates the second value by exclusive OR-ing the subset of the payload and the length field.

57. The communications device of claim 56 further comprising means for determining whether the number of payload bytes indicated by the length field exceeds a threshold, and wherein the detection means detects a valid payload further as a function of the length field determination.

58. The communications device of claim 56, further comprising means for receiving the frame in a serial byte stream, and means for determining whether all the payload bytes are received within a predetermined time from receipt of the first payload byte, wherein the detection means detects a valid payload further as a function of the payload byte determination.

59. The communications device of claim 56, further comprising means for receiving the frame in a serial byte stream, means for counting the number of payload bytes received within a predetermined time, and means for declaring an invalid frame if the payload byte count within the predetermined time is below a threshold.

60. The communications device of claim 59 further comprising means for recounting the number of payload bytes received within a second predetermined time if the payload byte within the predetermined time exceeds the threshold.

61. A communications device for communication of a payload in a communication system, the communications device, comprising:
   means for identifying a frame having a payload with a first value appended thereto;
   calculation means for calculating a second value as a function of a subset of the payload;
   comparison means for comparing the second value to the first value; and
   detection means for detecting a valid payload as a function of the comparison, wherein the subset of the payload comprises the third, fourth and fifth bytes of the payload following the preamble, and second subset of the payload comprises the third, fourth and fifth bytes of the payload following the preamble and the last byte of the payload, wherein the first value is appended to the beginning of the payload, the frame further comprising a third value appended to the end of the payload, the communications device further comprising second calculation means for calculating a fourth value as a function of second subset of the payload, and second comparison means for comparing the fourth value to the third value, wherein the detection means detects a valid payload as a function of both the comparison of the first value to the second value and the comparison of the third value to the fourth value, wherein the payload comprises a plurality of bytes, the communications device further comprising means for identifying a length field in the frame indicating the number of bytes in the payload, the calculation means and the second calculation means each calculating its respective second and fourth further as a function of the length field.

62. The communications device of claim 61 wherein the calculation means calculates the second value by exclusive OR-ing the subset of the payload and the length field, and the second calculation means calculates the fourth value by exclusive OR-ing the second subset of the payload and the length field.

* * * * *